INVENTOR
Herbert V. Thaden

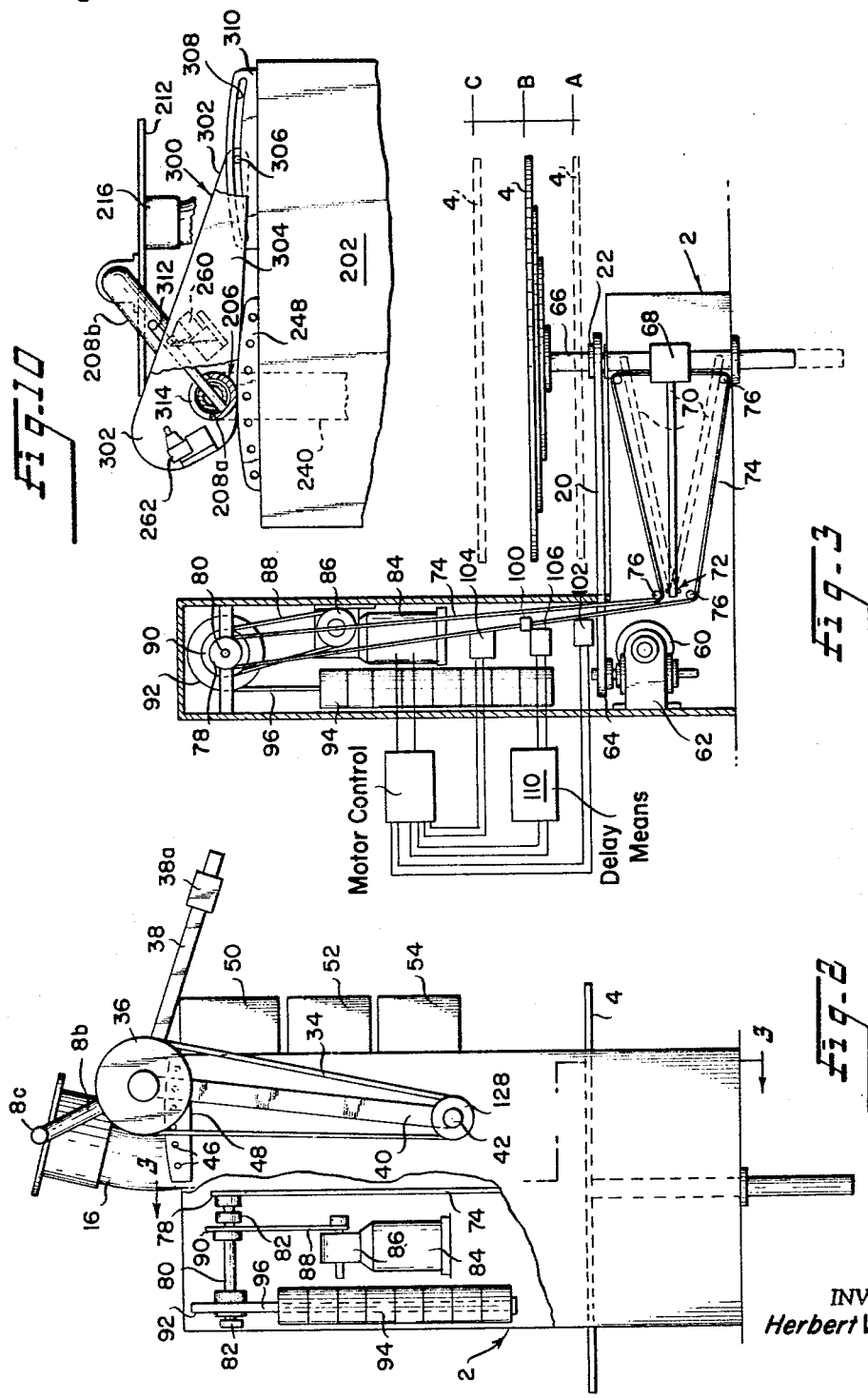

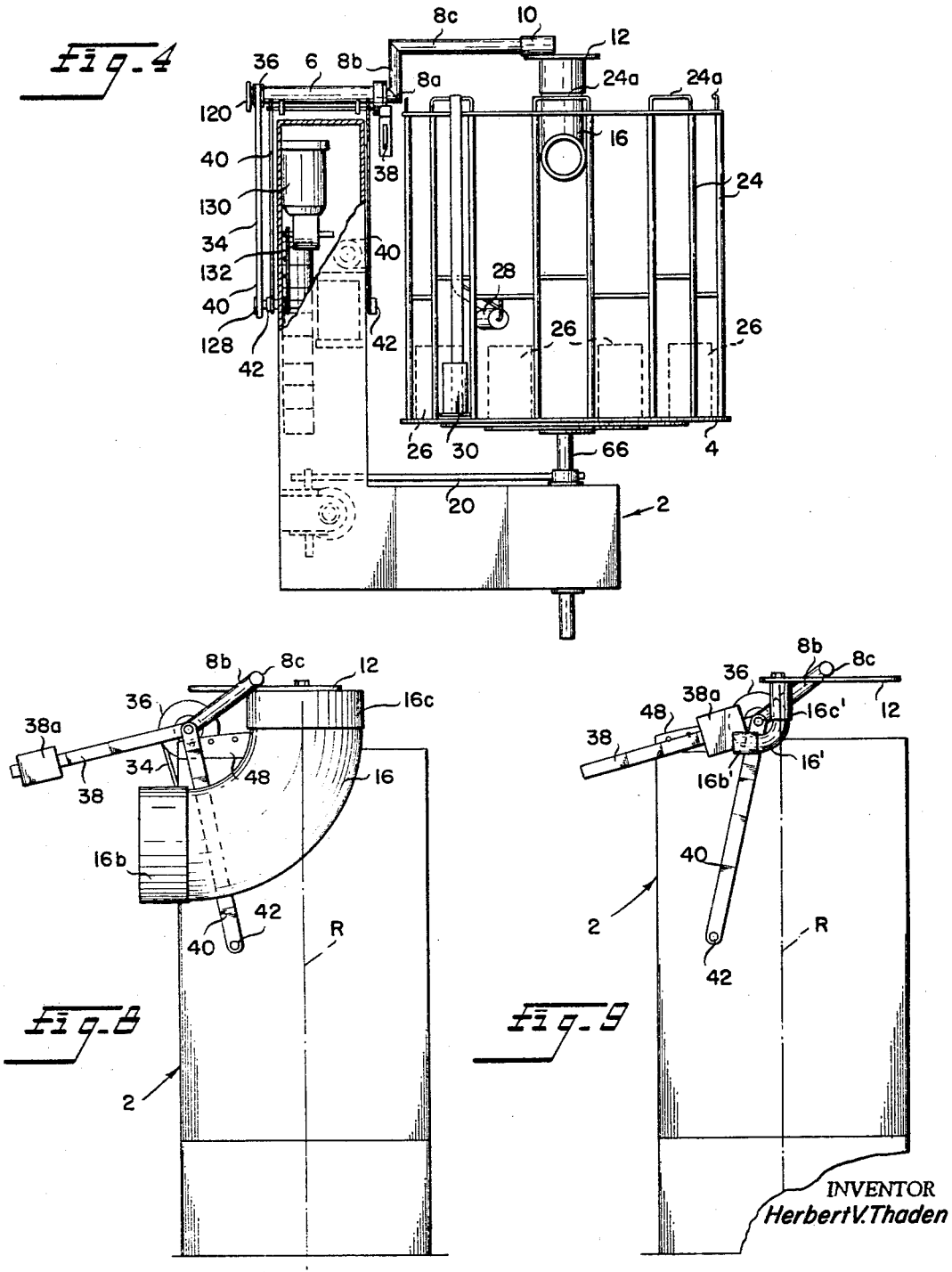

Aug. 20, 1968     H. V. THADEN     3,397,847
ELBOW WINDING APPARATUS
Filed Aug. 31, 1966     4 Sheets-Sheet 4
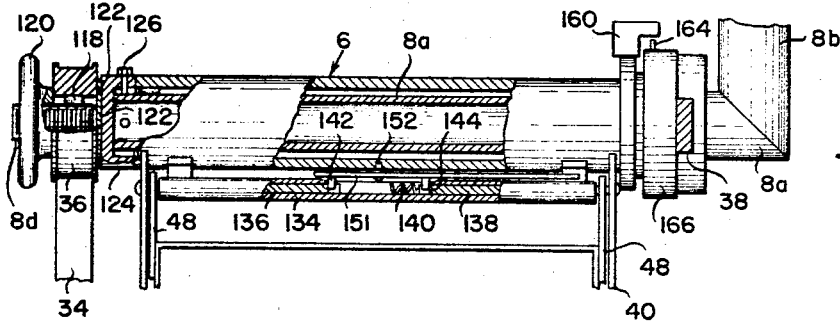
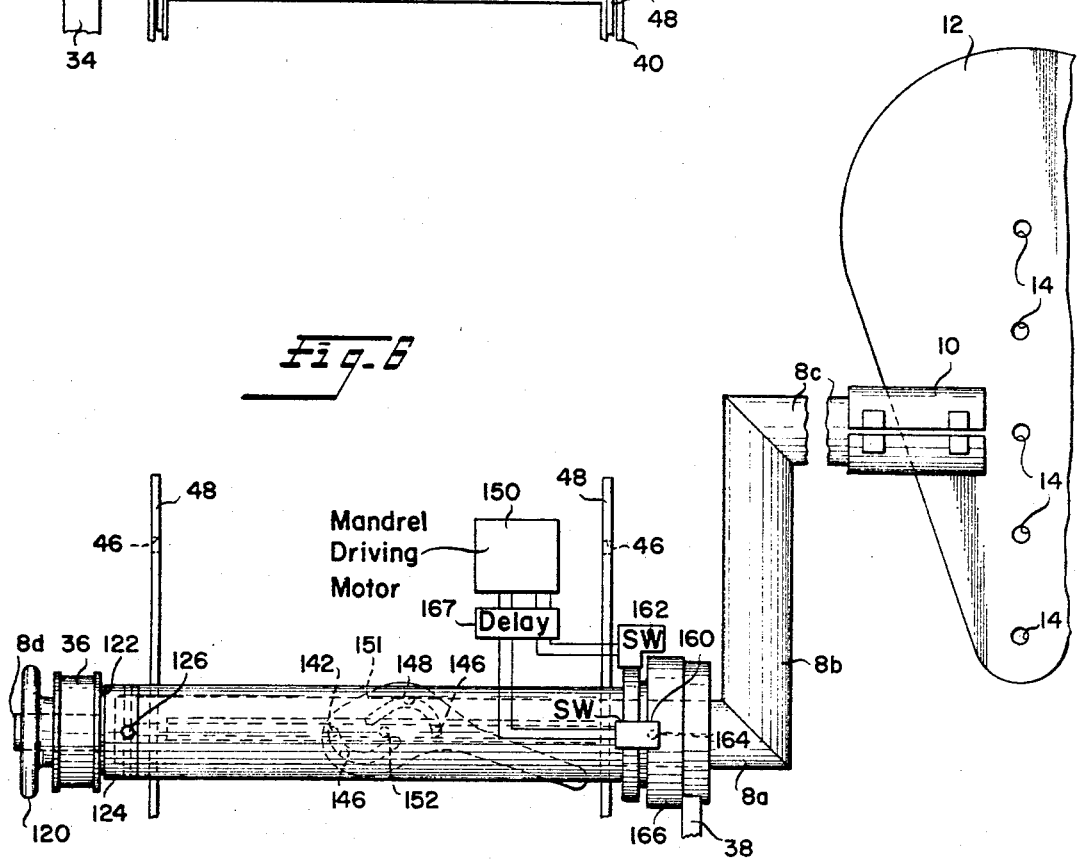
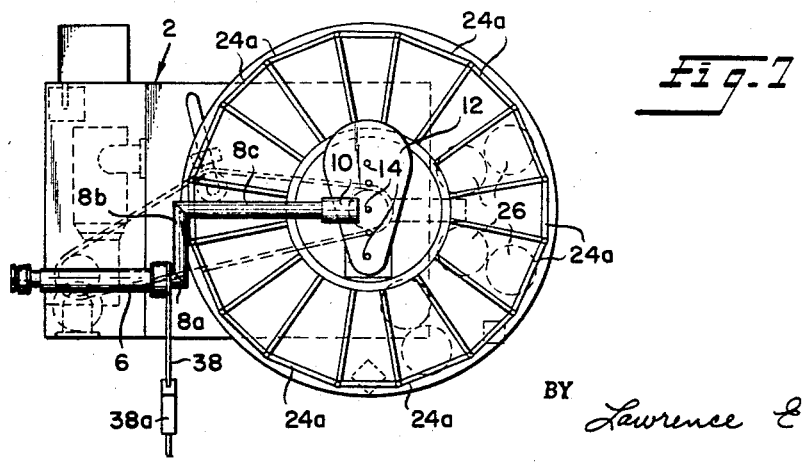
INVENTOR
Herbert V. Thaden
BY Lawrence E. Laubscher
ATTORNEY 3,397,847
ELBOW WINDING APPARATUS
Herbert V. Thaden, 1101 Main St.,
High Point, N.C. 27262
Filed Aug. 31, 1966, Ser. No. 576,473
11 Claims. (Cl. 242—7)

ABSTRACT OF THE DISCLOSURE

Winding apparatus for forming objects from resin-impregnated glass fiber roving, characterized by the provision of rotary guide means defining a circular winding zone, and means for displacing an elbow-shaped mandrel axially along a curvilinear path intersecting said winding zone. The mandrel includes a curved portion and at least one cylindrical portion, and means are provided for axially displacing said rotary guide means when the mandrel is maintained stationary at a position in which the cylindrical portion is adjacent and normal to said winding zone.

This invention relates generally to winding apparatus for forming a hollow elbow component from a continuous strip of resin-impregnated glass fiber material, and more particularly to winding apparatus including means for cyclically orbiting an elbow-shaped mandrel axially along a curvilinear path and for axially displacing a continuously rotating winding table to form by winding an elbow component having a curved body portion and a pair of generally cylindrical end portions.

In recent years, synthetic plastic pipes and conduits have been developed for use in conducting certain fluids (such as liquid or gaseous chemicals) that would normally cause damage to conventional metal conduits. In my prior U.S. patent application Ser. No. 297,003 filed July 23, 1963, entiled, "Hollow Products Formed From Glass Fiber Roving," now abandoned, a method and apparatus for forming such synthetic plastic conduits are disclosed. One problem facing the use of such non-metallic linear conduits is the manufacture of suitable elbow plumbing components for connecting the ends of conduits arranged at an angle to each other. The present invention was developed to provide an apparatus for readily and inexpensively forming such elbow connectors solely by winding about a mandrel continuous strips of resin-impregnated glass fiber roving, filament and/or tape.

Thus the primary object of the present invention is to provide means for winding upon an orbiting elbow-shaped mandrel one or more continuous strips of resin-impregnated glass fiber material. The invention is characterized in that means are provided for obtaining cyclic operation of mandrel orbiting means and winding table lifting means to form at each end of the wound elbow component enlarged cylindrical portions that are adapted to receive in concentric relation the adjacent end portions of the synthetic pipe sections that are connected by the elbow.

A more specific object of the invention is to provide elbow winding apparatus including crank arm means for orbiting an elbow-shaped mandrel axially along a curvilinear path contained in a vertical plane and intersecting a horizontal winding plane defined by glass fiber material guide means secured to a table that is continuously rotating about a vertical axis. The mandrel has cylindrical shaped enlarged end portions that are maintained stationary in vertical positions adjacent the horizontal winding plane, respectively, by the mandrel orbiting means. Table lifting means are provided for axially displacing the continuously rotating winding table to wind the glass fiber material around the mandrel cylindrical end portions. During winding of the curved body portion of the elbow, axial vertical movement of the continuously rotating table is interrupted and the curvilinear axial orbiting movement of the mandrel is initiated, whereby material is wound about the orbiting mandrel. By appropriate control of the table rotating and lifting means and the mandrel orbiting means, and by proper selection of the use of resin-impregnated glass fiber tape and/or roving, the desired thickness, composition and pitch of the turns of material wound upon the mandrel to form the elbow may be accurately determined as desired.

A further object of the invention is to provide means for adjusting the axis of pivotal movement of mandrel orbiting crank arm means relative to the vertical axis of rotation of the winding means, whereby the apparatus is operable to manufacture elbows of various sizes having different diameters and different radii of curvature. In accordance with an important feature of the invention, the horizontal bearings means supporting a first portion of the mandrel orbiting crank arm are mounted upon lever means for pivotal movement about a horizontal axis between predetermined laterally displaced positions to permit centering of the mandrel on the vertical axis of rotation of the tape means.

Other objects and advantages of the invention will become apparent from a study of the following specification, when considered in conjunction with the accompanying drawing, in which:

FIG. 2 is a partially sectioned side elevation view of the apparatus of FIG. 1;

FIG. 3 is a sectional view taken along line 3—3 of FIG. 2;

FIG. 4 is a front elevation view of the winding apparatus;

FIG. 5 is a detailed front elevation view, partly in section, of the means for locking the mandrel bearing means to the frame in selected laterally displaced positions;

FIG. 6 is a detailed top plan view of the mandrel displacing means;

FIG. 7 is a top plan view of the winding apparatus;

FIGS. 8 and 9 are schematic elevational views illus-section, of the means for locking the mandrel bearings means in accordance with the size of the elbow mandrel; and FIG. 10 illustrates a modification of the mandrel orbiting control means.

Figure 1:
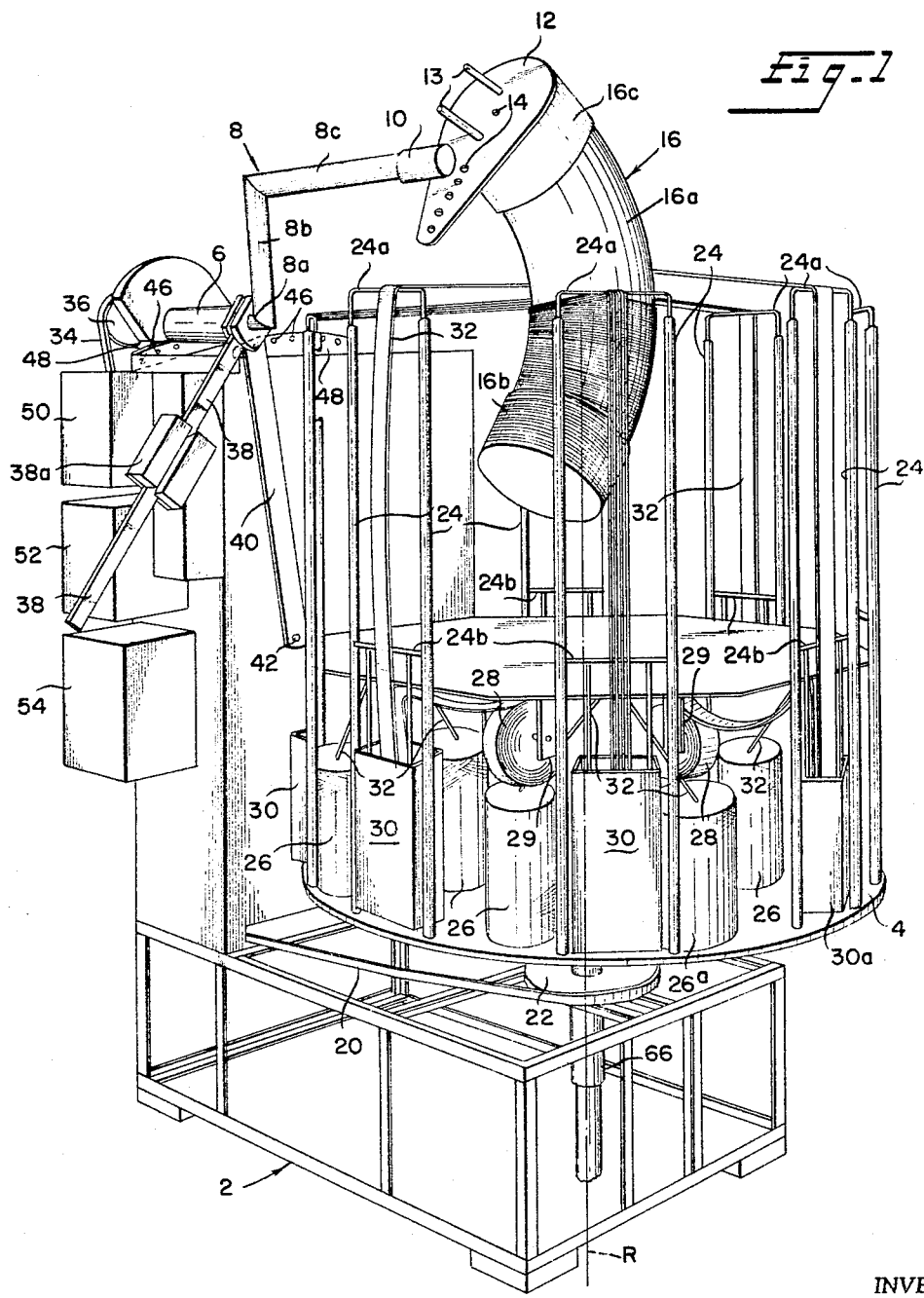
FIG. 1 is a perspective view of the elbow winding apparatus.

Referring first to FIG. 1, the elbow winding apparatus includes a frame 2 having first bearings means for supporting a table 4 for rotation about a vertical axis R, and second bearings means 6 for supporting the horizontal portion 8a of a crank arm 8 for pivotal movement about a horizontal axis. The crank arm 8 further includes a radial crank portion 8b and a second horizontal portion 8c to which is rigidly secured by bracket 10a mandrel plate 12 containing a row of apertures 14. Connected with the plate 12 by means of bolts 13 extending through one or more of the apertures is an elbow shaped mandrel 16. The mandrel includes a body portion 16a having a generally curvilinear axis contained in a vertical plane normal to the axis of the first horizontal crank portion 8a, and a pair of generally cylindrical enlarged end portions 16b, 16c.

The support table 4, which is continuously driven by chain 20 and sprocket 22, carries a plurality of circularly arranged guide means 24 the upper ends 24a of which are equally spaced from the vertical axis of rotation of the table to define a circular path of travel contained in a horizontal plane. Also carried by the table 4 are a plurality of spools 26 of glass fiber roving (or filaments), and reels 28 of glass fiber tape rotatably supported by support means 29. Associated with each of the guide means 24 is a receptacle 30 containing impregnating resin in the liquid state. Considering a given spool 26a, the roving 32 thereof is guided over a horizontal lower guide portion 24b of the guide means, is fed downwardly over guide means (not shown) submerged in the impregnating resin bath within container 30a, upwardly over the upper guide portion 24a, and inwardly in the horizontal winding plane toward the mandrel 16. Similarly the roving or filaments from the other spools 26 and the tapes from the reels 28 are guided through the corresponding resin impregnating baths, upwardly across the upper guide portions 24a, and inwardly in the horizontal winding plane to the mandrel 16.

The mandrel crank 8 is oscillated by means of belt 34 and pulley 36 to effect axial movement of the mandrel 16 along a curvilinear path within the aforementioned vertical plane, said curvilinear path intersecting the horizontal winding plane within the circular path of travel of the portions 24a of the guide means 24. Counterweight 38 secured to the horizontal shaft portion 8a serves to counterbalance the weight of the mandrel 16.

The mandrel bearings means 6 is supported for lateral swinging movement between fixed laterally displaced positions relative to the frame by a pair of spaced parallel levers 40 the lower ends of which pivot about a fixed horizontal pivot shaft 42 and the upper ends of which are secured to the bearings means 6. As will be described below with reference to FIG. 5, retractable pin means are carried by bearings means 6 for engagement with alined apertures 46 contained within a pair of parallel plates 48 secured to the upper portion of the frame, whereby the bearings means may be laterally adjusted between fixed positions relative to the frame in accordance with the size and radius of curvature of a given mandrel 16.

Electrical control boxes 50, 52 and 54 are provided for controlling the operation of an electrical table rotating motor, an electrical table lifting motor and an electrical mandrel operating motor, respectively, as will be described in greater detail below.

Referring now to FIGS. 2 and 3, the table 4 is continuously driven by an electric table rotating motor 60 via reduction gear 62, drive sprocket 64, chain 20 and driven sprocket 22. The sprocket 22, which is rotatably supported in bearings fixed to frame 2, is keyed to the vertical table shaft 66, whereby vertical movement of shaft 66 and table 4 relative to frame 2 and sprocket 22 is permitted. Secured to shaft 66 is a collar 68 that is pivotally connected at one end to a stabilizing lever 70. The other end of lever 70 is supported for sliding movement in support means 72 secured to frame 2. The collar 68 is also secured to an endless chain 74 that passes about guide sprockets 76 and driven sprocket 78. Sprocket 78 is secured to horizontal shaft 80 that is rotatably supported in fixed bearings 82 carried by the frame, said shaft being rotatably driven by the reversible table lifting motor 84 via reduction gear 86, chain 88 and sprocket 90. Also secured to the shaft 80 is a pulley 92 that supports counterweight 94 by belt 96, which counterweight balances the weight of table 4.

As shown in FIG. 3, the table lifting chain 74 carries actuator cam 100 that is operable to actuate reversing switches 102, 104 and a delay switch 106. The switches are secured to the frame 2 and are electrically connected with the motor control means of motor 84. When the table 4 is in the intermediate position B illustrated in FIG. 3, switch 106 is operated by cam 100 to energize conventional timer delay means 110, whereby the rotation of motor 84 is interrupted for a given period of time. At the end of this time, the motor begins to rotate in a direction causing a generally counterclockwise travel of chain 74, whereby collar 68, shaft 66 and table 4 are lifted upwardly (for a distance of about six inches) to the position C illustrated in phantom. When the table reaches this upper position, switch 102 is activated by cam 100 to effect reversal of the motor 84. Chain 74 is now driven in the clockwise direction, whereby table 4 is lowered to the illustrated position and switch 106 is again engaged by cam 100. Delay means 110 are again activated, and interruption of the operation of motor 84 is effected for the delay period. At the end of this delay period, motor 84 again rotates to lower the table to the lower position A, whereupon switch 104 is engaged by cam 100, the rotation of motor 84 is reversed, and the cycle of operation of motor 84 is repeated. During this vertical raising and lowering of the table, the table is continuously rotated by the motor 60.

Referring now to FIGS. 4–7, the horizontal portion 8a of mandrel orbiting crank 8 is rotatably supported in mandrel bearings 6 and includes at its free end a threaded portion 8d (FIG. 5) upon which is keyed the pulley 36 by key 118. Handwheel 120 mounted upon the extremity of threaded portion 8d serves to tighten the pulley against a friction-release clutch washer 122, whereby rotation of pulley 36 by belt 34 is directly transmitted to the mandrel crank via the collar 124 bolted thereto by bolt 126. The belt 34 is driven by pulley 128 secured to the horizontal shaft 42 journalled in frame 2, which shaft is rotatably driven by the reversible mandrel orbiting motor 130 via reduction gear 132. As described above, the lower ends of parallel levers 40 are journalled on shaft 42 and are secured at their upper ends to the bearings housing 6. Also secured to the housing 6 between the levers 40 is a tubular member 134 that contains at each and retractable pins 136, 138 that are biased apart by spring 140. At their adjacent ends, the pins have lateral projections 142, 144 that extend through an opening in tubular member 134 and terminate in cam grooves 146, 148 in double cam pin retractor 151 that is pivotally connected with bearings housing 6 by pivot 152. The outermost ends of pins 136, 138 extend through alined apertures 46 in the parallel plates 48 secured to frame 2. When cam retractor 151 is pivoted in the clockwise (FIG. 6) direction about pivot 152, the pins are retracted inwardly against the biasing force of spring 140, whereupon bearings 6 and levers 40 may be swung about pivot axis 42 to laterally displace mandrel shaft portion 8a relative to the vertical table axis R in accordance with the size and radius of curvature of mandrel 16.

For controlling the operation of the reversible mandrel motor 150, a pair of reversing switches 160, 162 are mounted in circumferentially spaced relation on the end of bearings means 6 for actuation by actuator 164 on collar 166 secured to shaft portion 8a. The switches, which are connected with motor 150 via conventional timer delay means 167, are so angularly displaced (generally by an angle of about 90°) that reversing switches 160, 162 are actuated to reverse the operation of motor 150 when the mandrel reaches its end positions of curvilinear travel relative to the horizontal winding plane defined by the upper portions 24a of guide means 24.

Referring now to FIGS. 8 and 9, it will be seen that when the mandrel 16 is of large size having a large internal diameter and a large radius of curvature, the levers 40 are pivoted in the counterclockwise direction about pivot 42 to the illustrated end position relative to plates 48, the weight portion 38a being adjacent the free end of counterweight arm 38. For a small size mandrel 16 (FIG. 9), the levers 40 are pivoted in the clockwise direction about pivot shaft 42 to the other end position relative to plates 48, the weight portion 38a of the counterweight being moved inwardly on arm 38. It will be further noted from FIGS. 8 and 9 that the mandrel is connected with the various holes 14 in plate 12 in accordance with the mandrel size and radius of curvature, so that the axis of the mandrel passes through the horizontal winding plane at a point intersected by the vertical axis of rotation R of the table 4.

*Operation*

Assume that initially the mandrel 16 is in its uppermost position prior to winding, that table 4 is in its lowermost position A, and that a wound elbow component is to be formed on the mandrel including helical turns of both tape and roving (or filaments) of glass fiber material. Following reference to previously prepared charts or the like setting forth a desired winding program, the operator adjusts the control 50 to effect a desired rotational speed of table rotating motor 60, control 52 to establish a desired relative rotational speed of table lifting motor 84, and control 54 to establish a desired relative rotational speed of the mandrel orbiting motor 130.

Strips of roving from a desired number of spools 26 are conducted upwardly over the lower guide portions 24b, downwardly into the resin baths 30, upwardly over the upper guides 24a, and inwardly in a horizontal winding plane, the ends of the mandrel being secured to the lower end of the cylindrical portion 16b of the mandrel (which cylindrical portion initially has a vertical orientation). Similarly, tape from one or more of the reels 28 is guided through a resin bath, across the guide 24a, and inwardly in the horizontal winding plane, the tape end being secured to the lower end of mandrel cylindrical portion 16b.

Controls 50, 52 and 54 are now activated, whereupon table 4 is continuously rotated at the predetermined speed by motor 60 via reduction gear 62, sprocket 64, chain 20 and sprocket 22. Owing to the operation of timer delay means 167, mandrel motor 150 is stationary, whereby mandrel 16 is temporarily maintained stationary at the initial position in which lower cylindrical portion 16b is vertical. Table lifting motor 84 rotates to drive chain 74 in the clockwise direction, whereupon collar 68, shaft 66 and table 4 are progressively raised upwardly from the position A in FIG. 3 toward the position B. During this upward movement of the rotating table relative to the mandrel (a distance equal to the length of cylindrical portion 16b), the resin-impregnated tape and roving are wound upon the mandrel. When the table 4 reaches the illustrated position B, cam 100 actuates switch 106 to energize timer delay means 110; whereupon rotation of motor 84 is interrupted temporarily to prevent further raising of the rotating table. At this time, delay means 167 causes operation of the mandrel driving motor 150, whereby mandrel 16 is progressively displaced colinearly downwardly in the vertical plane through the horizontal winding plane defined by guide portions 24a. During this downward orbiting travel of the mandrel, helical turns of tape and roving are wound upon the elbow shaped curved portion 16a of the mandrel. When the mandrel crank arm portion 8a has pivoted through the predetermined angle (approximately 90°), reversing switch 162 is actuated by actuator 164, whereupon timer delay means 167 interrupts operation of motor 150. The mandrel has now been axially displaced to a stationary position in which the upper cylindrical portion 16c is vertical. Timer delay means 110 now effects re-energization of motor 84, whereupon the continuously rotating table is lifted toward the upper position C to wind the tape and roving about the mandrel cylindrical portion 16c. At the upper table position C, reversing switch 104 is operated by cam 100 to reverse the operation of motor 84.

If desired, the operation of all motors could be terminated at this time to permit severing of the tape and roving supplied to the mandrel, whereupon the mandrel may be removed from plate 12, and the impregnating resin is permitted to cure. Following hardening of the wound glass fiber component, the mandrel is removed (for example, by breaking).

Following the connection of a new mandrel to the plate 12, the motors are again energized, whereupon the new mandrel is orbited upwardly to effect winding of the tape and roving thereabout as described above.

It is apparent that if double winding of the layers of tape and roving should be desired, the original mandrel would be left connected with the plate 12 during the upward return movement of the mandrel toward its initial upper position, the cycling operation of the table lifting motor and the mandrel orbiting motor being effected as previously described.

By appropriate manual adjustment of the motor control means 50, 52 and 54, the rates of rotation of the motors 60, 84 and 130, respectively, may be adjusted to vary the thickness and pitch of the helical turns of the resin-impregnated glass fiber tape and/or roving wound upon the mandrel.

Should it be desired to wind the material on a mandrel of smaller sizes having a smaller radius of curvature, double cam pin retractor is pivoted in the clockwise direction to retract pins 136, 138, whereupon the bearings 6 and levers 40 are pivoted about shaft 42 to a different position relative to the vertical axis of rotation of table 4 as shown in FIGS. 8 and 9, whereby the curvilinear axis of the mandrel passes through the vertical axis of rotation 12 of the table at the point of intersection with the horizontal winding plane.

Various means may be utilized for obtaining the desired cycling operation between the mandrel orbiting motor 130 and the table lifting motor 84. For example, the switch means 106 could be utilized to actuate the mandrel operating motor 130, and the reversing switches 162 and 164 could be used to control the operation of the table lifting motor 84, whereby the mandrel crank is maintained stationary at the positions in which cylindrical end portions 16b and 16c are vertical, respectively, at which times the table is raised between the positions A and B, and B and C, respectively.

Instead of rigidly mounting the mandrel orbiting limit switches 160 and 162 on the housing 6 as shown in FIGS. 5 and 6, the limit switches may be mounted for automatic adjustment in accordance with the position of lateral displacement of the housing as shown in FIG. 10, whereby stops between vertical and horizontal planes are provided regardless of the size or radius of the toroidal wind at a given time. To this end, a switch housing 300 including a pair of rigidly connected spaced plates 302, 304 is journalled at one end on the bearings housing 206, said plates being connected at their other end by a transverse pin 306 that extends through a cam slot 308 contained in plate 310 secured to the frame 202. Rigidly secured at one end to the horizontal portion 208a of the mandrel crank arm means is a switch actuating member or bar 312. This bar 312, which is arranged between the plates 302 and 304 and extends through a slot 314 contained in the bearings housing 206, is integral, parallel with and spaced from the crank arm portion 208b. The bar is arranged to actuate mandrel orbiting reversing switches 260, 262 (corresponding to the reversing switches 160, 162 of FIG. 6) that are rigidly secured between plates 302, 304, said switches being actuated by the bar when the respective end portions of the mandrel 216 have been orbited to vertical positions adjacent the winding plane as described above.

In this modification, as the bearings means 206 is laterally displaced relative to plates 248 in accordance with the size and diameter of the mandrel 216, the switch housing 300 is rotated about the bearings means 206 as a consequence of the guiding of pin 306 in cam slot 308, whereby the switches 260 and 262 always have the same vertical and horizontal orientation regardless of the lateral position of adjustment of the bearings 206.

While the preferred forms and embodiments of the invention have been illustrated and described, it will be apparent to those skilled in the art that various other modifications may be made in the apparatus described without deviating from the invention set forth in the following claims.

What is claimed is:

1. Winding apparatus for forming from a continuous strip of resin-impregnated glass fiber material an elbow-shaped component, comprising a frame;

an elbow-shaped mandrel having a curved portion and at least one cylindrical portion;
a source of resin-impregnated glass fiber material;
rotary guide means connected with said frame for winding said material radially inwardly from a circular path contained in a given winding plane;
means for displacing said mandrel axially along a curvilinear path intersecting said given plane within said circular path, whereby the material is wound upon said curved mandrel portion, said mandrel displacing means being operable also to place said mandrel in a first stationary position in which the mandrel cylindrical portion is adjacent and normal to said given plane;
and means operable when the mandrel is in said stationary position for progressively displacing said rotary guide means axially relative to said frame a given distance in one direction to effect winding of the material on the cylindrical portion.

2. Apparatus as defined in claim 1, wherein said mandrel includes a second cylindrical portion at the opposite end of said curved portion from said one cylindrical portion;
wherein said mandrel displacing means is operable successively to place said mandrel in said first stationary position with said one cylindrical portion normal to said winding plane, secondly to progressively displace said mandrel axially along said curvilinear path, and thirdly to place said mandrel in a second stationary position in which said other cylindrical portion is vertical;
and further wherein said means for displacing said rotary guide means is operable when said mandrel is in said second stationary position to displace said guide means a further given distance in said one direction, whereby the material is wound about said second cylindrical portion.

3. Apparatus as defined in claim 1, and further wherein said mandrel displacing means includes crank arm means having a first horizontal shaft portion normal to the plane containing said mandrel curved portion, and bearings means pivotally connecting said horizontal shaft portion with said frame.

4. Apparatus as defined in claim 3, and further including adjusting means permitting lateral adjustment of said bearings means relative to said frame between fixed laterally displaced positions in accordance with the size and radius of curvature of said mandrel means.

5. Apparatus as defined in claim 4 wherein said adjusting means comprises lever means connecting said bearings means with said frame for lateral swinging movement about a horizontal pivot axis normal to said mandrel plane, and releasable means connecting said bearings means with said frame in a given one of said laterally adjusted positions.

6. Apparatus as defined in claim 5 wherein said lever means includes a pair of parallel levers longitudinally spaced relative to said bearings means; each of said levers being connected at one end with said bearings means and pivotally connected at the other end with said frame about a common pivot axis.

7. Apparatus as defined in claim 6 wherein said releasable means comprises at least one apertured plate connected with said frame parallel with said mandrel plane and normal to said bearings means, and axially retractable pin means carried by and parallel with the axis of said bearings means for insertion within an aperture of said plate.

8. Apparatus as defined in claim 3, wherein said mandrel displacing means further includes a reversible mandrel orbiting motor connected with said first shaft portion, and switch means for reversing the operation of said mandrel motor when the end portions of said mandrel are adjacent said horizontal winding plane, respectively.

9. Apparatus as defined in claim 2 wherein said means for displacing said rotary guide means includes a reversible lifting motor, and limit switch means for reversing the operation of said lifting motor when said table is at the upper and lower limits of displacement relative to said frame, respectively.

10. Apparatus as defined in claim 8, wherein said switch means includes a pair of reversing switches alternately operable by said crank arm means when the mandrel is at its end positions of travel, respectively, and further including switch orienting means for maintaining said reversing switches in constant vertical and horizontal orientation during the lateral displacement of said mandrel bearings means.

11. Apparatus as defined in claim 10, wherein said switch orienting means comprises a switch housing journalled on said bearing means, and cam means connected with the frame for adjusting the position of the switch housing on said bearings means to maintain a constant switch orientation during lateral adjustment of said bearings means.

References Cited

UNITED STATES PATENTS

| | | | |
|---|---|---|---|
| 2,666,283 | 1/1954 | Dearborn | 242—7 XR |
| 2,773,651 | 12/1956 | Whipple | 242—4 |
| 2,974,890 | 3/1961 | Davis | 242—4 |
| 3,128,056 | 4/1964 | Fahrbach | 242—9 |

BILLY S. TAYLOR, *Primary Examiner.*